(12) United States Patent
Kamiya et al.

(10) Patent No.: US 7,873,704 B2
(45) Date of Patent: Jan. 18, 2011

(54) COMMUNICATION SYSTEM, RELAY DEVICE, AND COMMUNICATION CONTROL METHOD

(75) Inventors: Dai Kamiya, Tokyo (JP); Kazuhiro Yamada, Yokohama (JP); Takashi Kondo, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 306 days.

(21) Appl. No.: 10/529,925

(22) PCT Filed: Sep. 30, 2003

(86) PCT No.: PCT/JP03/12508

§ 371 (c)(1),
(2), (4) Date: Dec. 26, 2006

(87) PCT Pub. No.: WO2004/029815

PCT Pub. Date: Apr. 8, 2004

(65) Prior Publication Data

US 2007/0143444 A1 Jun. 21, 2007

(30) Foreign Application Priority Data

Sep. 30, 2002 (JP) .............................. 2002-286712

(51) Int. Cl.
*G06F 15/16* (2006.01)
(52) U.S. Cl. ........................ 709/219; 709/200; 709/203; 709/227; 709/228; 709/223
(58) Field of Classification Search ................. 709/219, 709/223, 203, 227, 228, 200; 726/12, 13
See application file for complete search history.

(56) References Cited

U.S. PATENT DOCUMENTS

| 5,822,524 | A | * | 10/1998 | Chen et al. | 709/203 |
| 5,991,810 | A | * | 11/1999 | Shapiro et al. | 709/229 |
| 6,393,479 | B1 | * | 5/2002 | Glommen et al. | 709/224 |
| 6,442,611 | B1 | * | 8/2002 | Navarre et al. | 709/227 |

(Continued)

FOREIGN PATENT DOCUMENTS

CN       1276662       12/2000

(Continued)

OTHER PUBLICATIONS

Chinese Office Action dated Jan. 19, 2007.

(Continued)

*Primary Examiner*—John Follansbee
*Assistant Examiner*—Anthony Mejia
(74) *Attorney, Agent, or Firm*—Brinks Hofer Gilson & Lione

(57) ABSTRACT

A communication management table is provided to a gateway server 400 relaying data communication between Java-enabled MS 600 and Java-enabled CS 200. Gateway server 400 refers to Java application related information included in a request message sent from the Java-enabled MS 600 and to a communication management table stored in gateway server 400, thereby determining whether to permit the communication request. In a case that the communication request is determined to be rejected, gateway server 400 does not transmit the request message RQ to Java-enabled CS 200; instead, the gateway server sends a response message to Java-enabled MS 600, indicating that the communication request will be rejected.

20 Claims, 10 Drawing Sheets

U.S. PATENT DOCUMENTS

| | | | |
|---|---|---|---|
| 7,359,933 B1* | 4/2008 | Polen et al. | 709/203 |
| 7,363,354 B2* | 4/2008 | Lahti | 709/219 |
| 7,610,404 B2* | 10/2009 | Scott et al. | 709/242 |
| 7,620,722 B1* | 11/2009 | Ruparel | 709/227 |
| 2001/0010061 A1* | 7/2001 | Matsumoto | 709/249 |
| 2002/0002605 A1* | 1/2002 | Honda | 709/219 |
| 2002/0015384 A1* | 2/2002 | Huang et al. | 370/231 |
| 2002/0026645 A1* | 2/2002 | Son et al. | 725/117 |
| 2002/0032781 A1* | 3/2002 | Yoshida et al. | 709/228 |
| 2002/0089929 A1 | 7/2002 | Tallegas et al. | 370/230 |
| 2002/0169878 A1* | 11/2002 | Orenshteyn | 709/227 |
| 2003/0060189 A1* | 3/2003 | Minear et al. | 455/411 |
| 2003/0135546 A1* | 7/2003 | Yoshioka | 709/203 |
| 2003/0200254 A1* | 10/2003 | Wei | 709/203 |
| 2004/0039801 A9* | 2/2004 | Srinivasan et al. | 709/221 |
| 2004/0205359 A1 | 10/2004 | Matsuhira | 713/201 |
| 2004/0260767 A1* | 12/2004 | Kedem et al. | 709/203 |

FOREIGN PATENT DOCUMENTS

| | | |
|---|---|---|
| JP | 06-231076 | 8/1994 |
| JP | 11-194903 | 7/1999 |
| JP | 2000-099476 | 4/2000 |
| JP | 2002-044150 | 2/2002 |
| JP | 2002-091850 | 3/2002 |
| JP | 2002-111745 | 4/2002 |
| JP | 2002-163183 | 6/2002 |
| JP | 2002-232554 | 8/2002 |
| JP | 2002-271396 | 9/2002 |
| JP | 2002-278860 | 9/2002 |
| JP | 2002-281093 | 9/2002 |
| WO | WO 02/067512 A1 | 8/2002 |

OTHER PUBLICATIONS

Office Action issued Aug. 17, 2007 in Chinese patent application No. 03823078.X (with translation).
Japanese Office Action w/ English translation dated May 12, 2009, 4 pgs.
Chinese Office Action w/ English translation dated May 25, 2009, from Chinese Application No. 03823078X, 11 pgs.
Japanese Office Action dated Apr. 27, 2010, in Japanese Patent Application No. 2002-286712 (with English translation, 5 pgs.).
Japanese Office Action w/ English translation dated Apr. 15, 2008.
US 7,356,839, 04/2008, Rutherglen et al. (withdrawn)*

* cited by examiner

FIG. 4

COMMUNICATION MANAGEMENT TABLE TA

| | | |
|---|---|---|
| PRIMARY COMMUNICATION REGULATIVE INFORMATION | | ○△··· BYTE AND LOWER BYT |
| SECONDARY COMMUNICATION REGULATIVE INFORMATION | Java APPLICATION IDENTIFICATION INFORMATION | APPLICATION3, APPLICATION35··· |
| | ACTIVATION TYPE INFORMATION | TIMER ACTIVATION BY USER (CORRESPONDING TO APPLICATION 3)··· |
| | DOWNLOAD SOURCE IDENTIFICATION INFORMATION | SERVER24, SERVER56··· |
| CURRENT COMMUNICATION INFORMATION | | △□···BYTE |

FIG. 5

RESPONSE MESSAGE RS

| COMMUNICATION REJECTION INFORMATION | COMMUNICATION RESTRICTION INFORMATION | ... |
|---|---|---|

FIG. 9

<DESCRIPTION ENTRY OF ADF>

| NAME | MUST/OPTIONAL | CONTENTS |
|---|---|---|
| FILE SIZE INFORMATION | MUST | SIZE OF Jar FILE |
| URL INFORMATION | MUST | STORAGE LOCATION (LOCATION) OF Jar FILE |
| MODEL INFORMATION | MUST | NAME OF SUBJECT MOBILE TELEPHONE |
| FILE NAME INFORMATION | MUST | NAME OF Java APPLICATION |
| ... | ... | ... |
| TIMING INFORMATION | OPTIONAL | ACTIVATION TIMING OF AUTOMATICALLY ACTIVATING Java APPLICATION |
| VERSION INFORMATION | OPTIONAL | VERSION NAME OF Java APPLICATION |
| ... | ... | ... |

FIG. 10
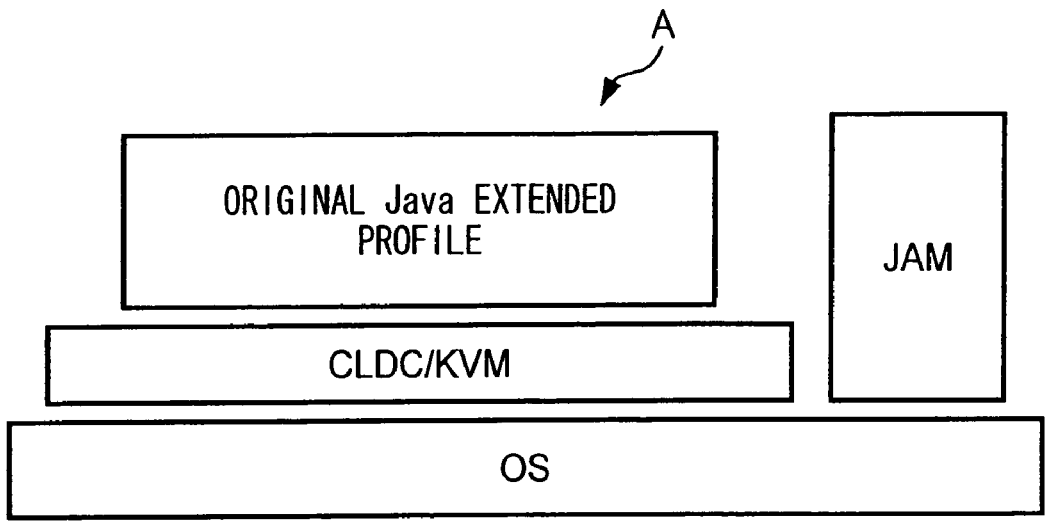
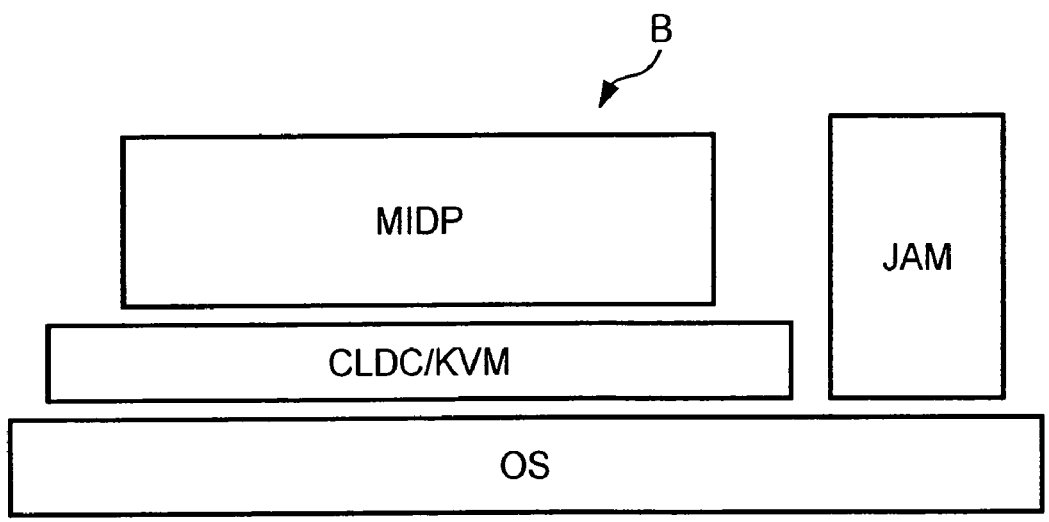
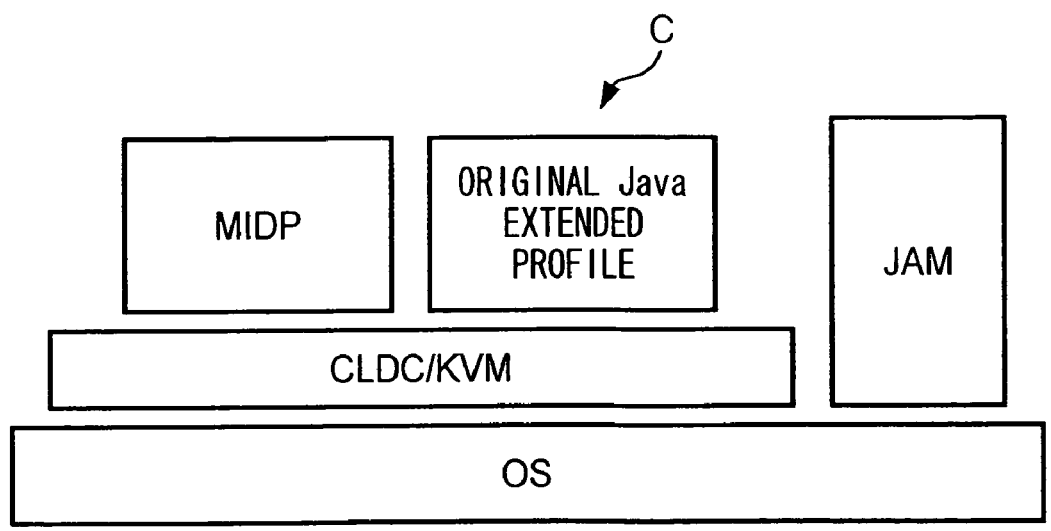

COMMUNICATION SYSTEM, RELAY DEVICE, AND COMMUNICATION CONTROL METHOD

TECHNICAL FIELD

The present invention relates to a communication system, a relay device, and a communication control method.

BACKGROUND ART

As Web (World Wide Web) technique has developed, services for downloading various applications from a Web server terminal to a Web client terminal via a communication network including the Internet have become widespread and common. A user having a client terminal accesses a Web server terminal using a Web browser provided in the client terminal and sends to the Web server terminal a download request for an application. In this process, the application desired by the user is downloaded from the Web server terminal to the Web client terminal. This technique is disclosed in Japanese patent laid-open No. 2002-189600 for example (page 2 and page 4).

Some applications downloaded to a Web client terminal cause a communication problem in that the application continues communicating with a Web server terminal, the downloading source. If so, unless a user cancels the communication by operating a client terminal, the communication process will continue almost endlessly.

DISCLOSURE OF INVENTION

The present invention has been presented in view of the above explained circumstances and an aim is to provide a communication system, a relay device, and a communication control method that are able to regulate communication performed by an application, so that communication and download problems do not occur.

To solve the problems described above, a communication system of the present invention is characterized by comprising a communication terminal; and a relay device for relaying data communication between the communication terminal and a server; the communication terminal comprising: storage means for storing an application that communicates with a server via a network; sending means for communicating with the server in response to the application; and before performing the communication, including application related information related to the application in a communication request, and sending the request to the server; the relay device comprising: receiving means for receiving a communication request from the communication terminal; relay processing means for relaying communication requested from the communication request; and in a case that application related information included in the communication request satisfies a predetermined condition, regulating the communication requested from the communication request.

In the configuration described above, the relay device the device determines whether application related information satisfies a predetermined condition. In a case of determining that the application related information satisfies a predetermined condition, the relay device regulates communication requested by the communication request. As explained, in a case that an application installed in a communication terminal satisfies a predetermined condition, a relay device regulates communication performed by the application; therefore, it is possible to reduce the burden on the relay device at peak time in communication.

In a preferred embodiment, the application related information may also include communication identification information indicating, in a case that the application run by the sending means is an application of a specific type, that the communication is performed by an application of a specific type; and wherein, the relay processing means further regulates, in a case that the application related information includes the communication identification information, communication requested by the communication request.

Furthermore, the application related information may also include activation type information indicating the activation mode of the application; and wherein, the relay processing means further regulates, in a case that an activation type indicated by the activation type information included in the application related information, communication requested by the communication request.

Furthermore, the application related information may also include server identification information for identifying a server from which the application is delivered; and wherein, the relay processing means further regulates, in a case that the server identified by server identification information included in the application related information is a specific server, communication requested by the communication request.

Furthermore, the application related information may also include application identification information for identifying the application; and wherein, the relay processing means further regulates, in a case that the application identified by application identification information included in the application related information is a specific application, communication requested by the communication request.

BRIEF DESCRIPTION OF THE DRAWINGS

FIG. 4 is a diagram for explaining communication management table TA according to the present embodiment.

FIG. 5 is a diagram for explaining a response message RS according to the present embodiment.

FIG. 9 is a diagram illustrating a descriptive entry of ADF.

FIG. 10 is a diagram illustrating various locations of the profiles in Java runtime environment according to modification example 7.

DETAILED DESCRIPTION OF THE DRAWINGS AND THE PRESENTLY PREFERRED EMBODIMENTS

A. Present Embodiment (1) Configuration of the Embodiment

<Configuration of Communication System 100>

Figure 1:
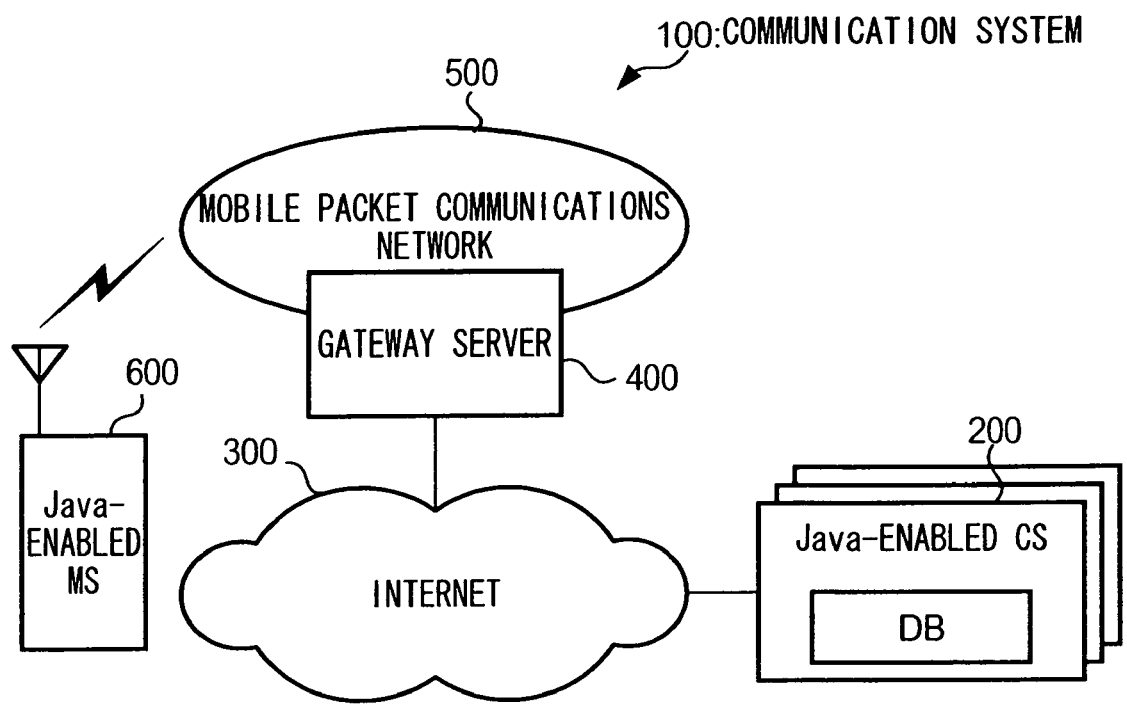
FIG. 1 is a diagram showing the configuration of a communication system in the present embodiment.

FIG. 1 is a diagram showing the configuration of a communication system according to the present embodiment. Communication system 100 provides a service for delivering an application written in Java (a trademark of Sun Microsystems, Inc.; also applies to the following description) language which is one of the programming languages that is dependent to a lesser degree on the model or the operating system to which the service is delivered.

Communication system 100 comprises a content server 200 for providing a Java application (hereinafter, referred to as Java-enabled CS) 200, a gateway server 400 provided in mobile packet gateway relay switching center (not shown) for interconnecting Internet 300 and a mobile packet communications network 500, and a mobile device 600 capable of downloading a Java application provided from Java-enabled CS 200 via Internet 300, gateway server 400, and mobile packet communications network 500; hereinafter, the mobile device is referred to as Java-enabled MS. Communication system 100, further includes mobile phone networks (not shown) for providing general telephone services to various types of mobile devices (including Java-enabled MS 600). Communication system 100 typically includes plural Java-enabled CSs 200 and Java-enabled MSs 600; to avoid the figure from becoming complicated, one of each, Java-enabled CS 200 and Java-enabled MS 600 are represented in FIG. 1.

Java-enabled CS 200 is connected to Internet 300 via a dedicated line to provide various Java applications (including Java applications for various games) stored in database DB. FIG. 1 illustrates a case in which Java-enabled CS 200 is directly connected to Internet 300 via a dedicated line; the Java-enabled CS may also be directly connected to gateway server 400 via a dedicated line.

Gateway server 400 is comprised of a CPU, a ROM, a computer having RAM, and a communication device. The CPU of gateway server 400 runs a relay program stored in ROM and relays the transfer of data between networks using different communication protocols. More specifically, gateway server 400 runs the relay program to convert both TCP/IP (Transmission Control Protocol/Internet Protocol) which is a standard protocol of Internet 300 and communication protocol for mobile packet communication, and relays the transfer of data between Internet 300 and mobile packet communications network 500. Further to the above described data relay function, Gateway server 400 provides a function for regulating communication by a Java application installed in Java-enabled MS 600.

Mobile packet communications network 500 provides a packet communication service to mobile devices (including Java-enabled MS 600) accommodated in mobile packet communications network 500. Mobile packet communications network 500 includes a plurality of gateway servers 400 and base stations (not shown) for performing wireless communication with mobile devices located in wireless cells covered by the stations.

Java-enabled MS 600 is a mobile phone equipped with an environment for running applications described in Java language (hereinafter, referred to as Java runtime environment) and is capable of running Java applications downloaded from Java-enabled CS 200. Some of the Java applications installed in Java-enabled MS 600 perform communication with Java-enabled CS 200, the download source, each time the application is activated. In a case that such a Java application is activated, gateway server 400 determines whether a communication by the Java application be permitted and according to the determination, regulates communication by the Java application.

A detailed configuration of gateway server 400 and Java-enabled MS 600 included in communication system 100 will next be explained.

<Configuration of Gateway Server 400>

Figure 2:
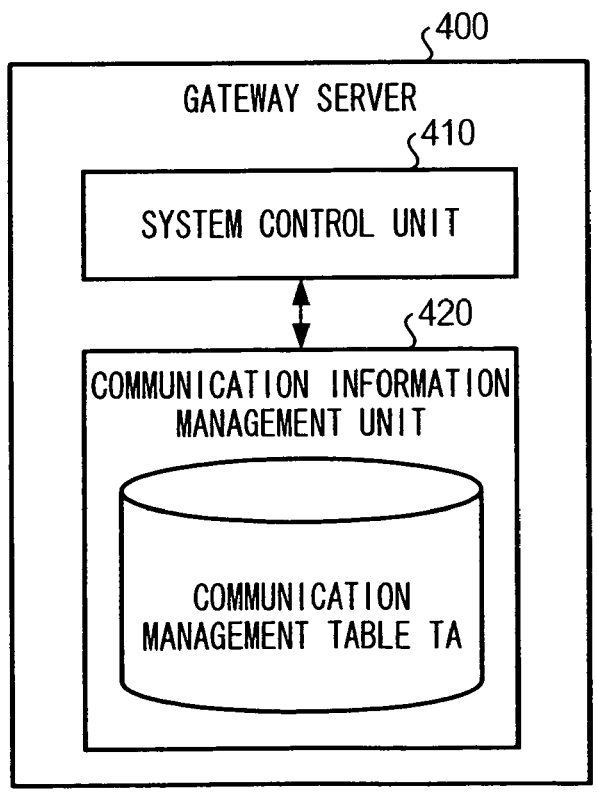
FIG. 2 is a diagram showing the configuration of a gateway server according to the present embodiment.

FIG. 2 is a block diagram showing the function configuration of gateway server 400.

System control unit 410 controls each unit of gateway server 400 and functions as an interface between different networks; the interface function is to perform protocol conversion with other networks including Internet 300 and mobile packet communications network 500.

Communication information management unit 420 comprises communication management table TA which stores various types of information relating to communication regulation. When receiving a request message for communication via mobile packet communications network 500 from Java-enabled MS 600, system control unit 410 performs the following processes. Referring to the request header included in the received request message, system control unit 410 determines whether the communication request is sent from a Java application installed in Java-enabled MS 600. When a determination is made that the communication request is sent from a Java application, system control unit 410 refers to Java application related information included in the request header and communication management table TA, thereby determining whether to permit the communication request (the details will be described later).

Figure 3:
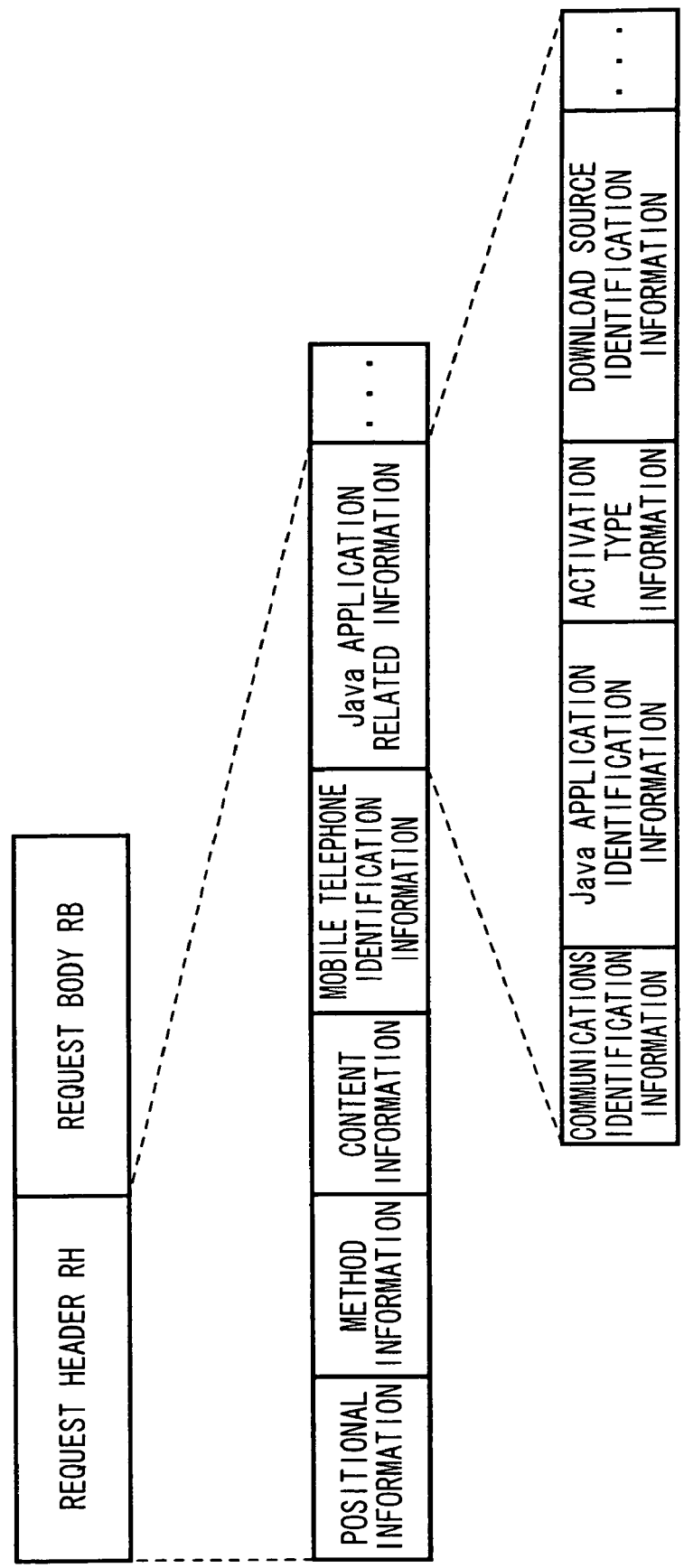
FIG. 3 is a diagram for explaining a request message RQ according to the present embodiment.

FIG. 3 and FIG. 4 are diagrams explaining a request message RQ and communication management table TA respectively.

As shown in FIG. 3, request message RQ comprises a request header RH and a request body RB. In request header RH are stored: positional information, such as a URL that indicates the resource location on Java-enabled CS 200, method information indicating the method type such as a GET method (a method for acquiring data from Java-enabled CS 200 to which Java enabled MS is connected) and a POST method (a method for sending data to Java-enabled CS 200 to which Java-enabled MS is connected), content information indicating a content type (whether text or an image, for example), mobile phone identification information such as a telephone number or a mail address for identifying Java-enabled MS 600, and Java application related information.

Java application related information is information relating to a Java application for performing communication request; the information includes the following:

Communications identification information: Information indicating that a communication request is requested from a Java application; in a case that a communication is by a Java application, the information is indicated, for example, by a numeral "0".

Java application identification information: Information for identifying the Java application; the information would pertain to the name of the Java application, for example.

Activation type information: Information indicating the activation type of the Java application; the activation type includes a timer activation by a user, for example.

Download source identification information: Information for identifying Java-enabled CS 200, a download source of the Java application; the information pertains to the name of the Java-enabled CS 200, for example.

Various information to be sent to Java-enabled CS 200, an access point, at the time of using POST method are described in request body RB.

On the contrary, primary communication regulating information and secondary communication regulating information are registered with communication management table TA (refer to FIG. 4) stored in communication information management unit 420 of gateway server 400.

Note that, primary communication regulating information is information for regulating communications by Java applications, in a case that a gateway server is accessed from a plurality of Java applications at one time; the first information includes information pertaining to the communication amount that can be processed at one time.

Secondary communication regulating information is information for regulating communication by the Java application which, as a result of access, is likely to cause a problem in communication such as communication continuing endlessly due to a bug. The secondary communication regulating information includes Java application identification information for identifying a Java application which communicates endlessly (because of the occurrence of a bug, for example), that puts the communication logic of the application into an infinite loop state; activation type information representing the activation type that causes a bug in a case that a bug occurs only as a result of a specific activation type, and download source identification information for identifying Java-enabled CS 200 which originally provided the Java application that may already contain a bug.

Along with primary communication regulating information and secondary communication regulating information, current communication information indicating the communication amount currently passing through gateway server 400 is registered with communication management table TA. System control unit 410 also has the function of monitoring the communication amount passing through gateway server 400; and on the basis of the monitoring result, sets/updates current communication information registered with communication management table TA.

System control unit 410 refers to Java application related information included in the request message RQ and communication management table TA stored in communication information management unit 420, thereby determining whether to permit the communication request. In a case that the communication request is determined to be permitted, system control unit 410 performs a protocol conversion on the request message RQ and transmits the converted message to Java-enabled CS 200 corresponding to positional information included in a request header RH. Conversely, in a case that the communication request is determined to not be permitted, system control unit 410 sends to Java-enabled MS 600 a response message indicating that the communication request must be rejected.

FIG. 5 illustrates a response message RS sent in the above described process.

Communication rejection information indicating that a communication request be rejected and communication regulation information for regulating communication for n periods after receiving a response message RS are included in the message.

In accordance with the communication regulation information included in the response message RS, Java-enabled MS 600 that has received the response message RS via mobile packet communications network 500 regulates the communication by a Java application installed in Java-enabled MS 600 for n seconds after receiving the response message RS. As such, communication by a Java application is regulated.

<Configuration of Java-Enabled MS 600>

Figure 6:
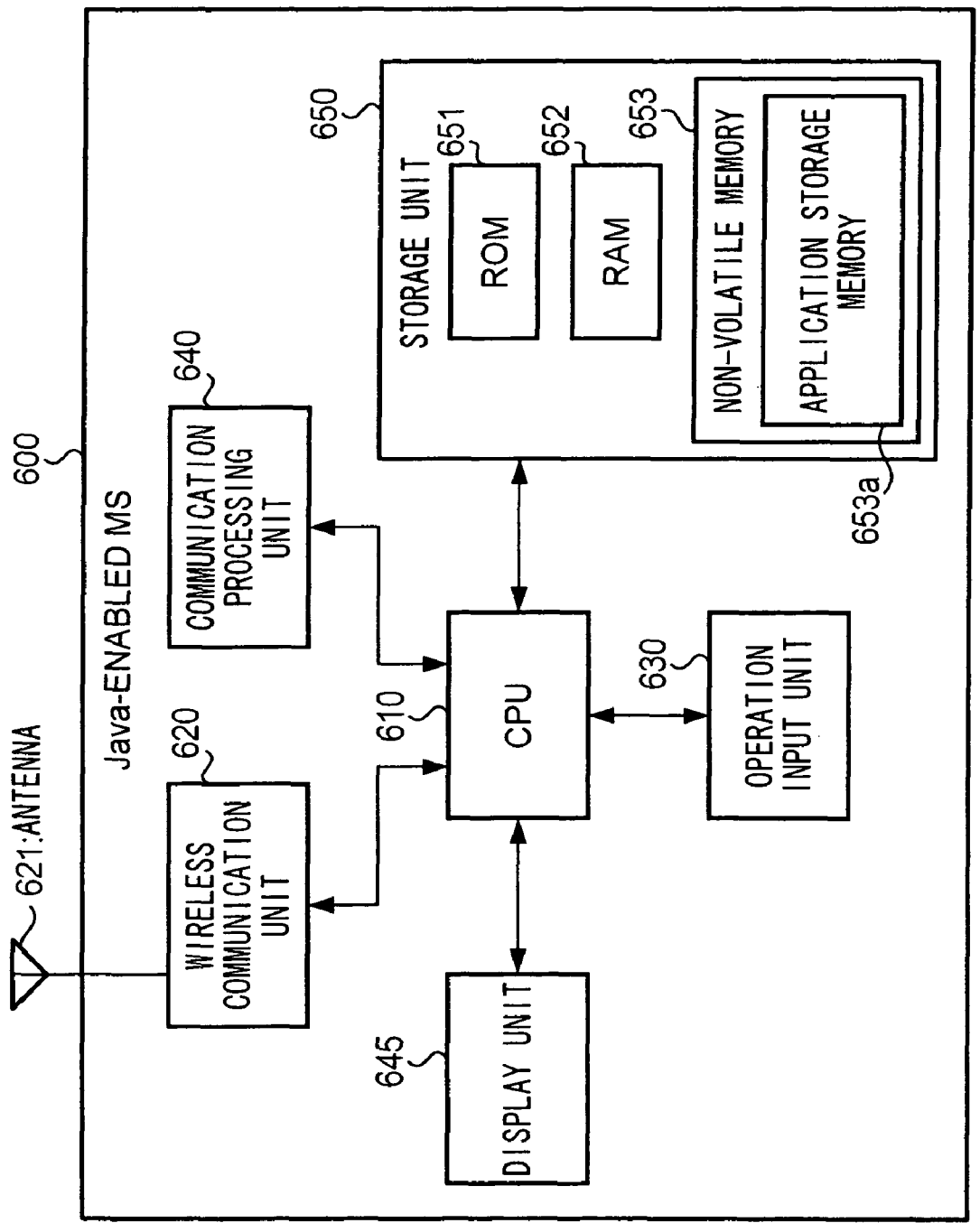
FIG. 6 is a diagram showing the hardware configuration of Java enabled MS according to the present embodiment.

FIG. 6 is a diagram showing the hardware configuration of Java-enabled MS 600.

CPU 610, in accordance with various control programs stored in storage unit 650, controls each unit of Java-enabled MS 600.

Wireless communication unit 620 is equipped with an antenna and controls wireless communication between base stations. Under control of CPU 610, wireless communication unit 620 generates wireless signals by superimposing data relating to a transmitter voice, or data for packet communication on a carrier wave and transmits the signal to base stations via antenna 621; conversely, the communication unit demodulates wireless signals received from base stations via antenna 621 and acquires data relating to a receiving voice, or data for packet communication.

Operation input unit 630 is equipped with power on/off key and operation keys for inputting numerals, words, and operation instructions; and by which outputs the operation signals to CPU 610 in response to the key operations.

Communication processing unit 640 includes a microphone or a speaker, a voice processing unit (not shown) for example; and under control of CPU 610, performs communication processing including calling connection/disconnection process. Display unit 645 has a LCD (Liquid Crystal Display) or a drive circuit for performing display control of LCD; by which the unit displays information in the form of various characters, images or text.

Storage unit 650 includes ROM 651, RAM 652, and non-volatile memory 653 including SRAM (Static-RAM) or EEPROM (Electrically Erasable Programmable Read Only Memory).

Various programs executed by CPU 610 are stored in ROM 651. ROM 651 stores OS for Java-enabled MS 600, software such as a Web browser for viewing applications written in HTML (HyperText Markup Language) using an HTTP (HyperText Transfer Protocol) or an HTTPS (Hypertext Transfer Protocol Security) (hereinafter, referred to as microbrowser), and software for providing the above-described Java runtime environment.

RAM 652 is used as a work memory of CPU 610 and is used for temporarily storing various data, and is also used at the time of running a Java application installed in Java-enabled MS 600.

Non-volatile memory 653 has an application storage memory 653a. Application storage memory 653a stores in correspondence with Java applications downloaded from Java-enabled CS 200, data to be stored even after the execution of a Java application ends (hereinafter, referred to as permanent data), and information required for preparing request message RQ (refer to FIG. 3) which is sent to Java-enabled CS 200, the download source, at the time of starting communication; the information includes method information or Java application related information.

<Java Runtime Environment>

Figure 7:
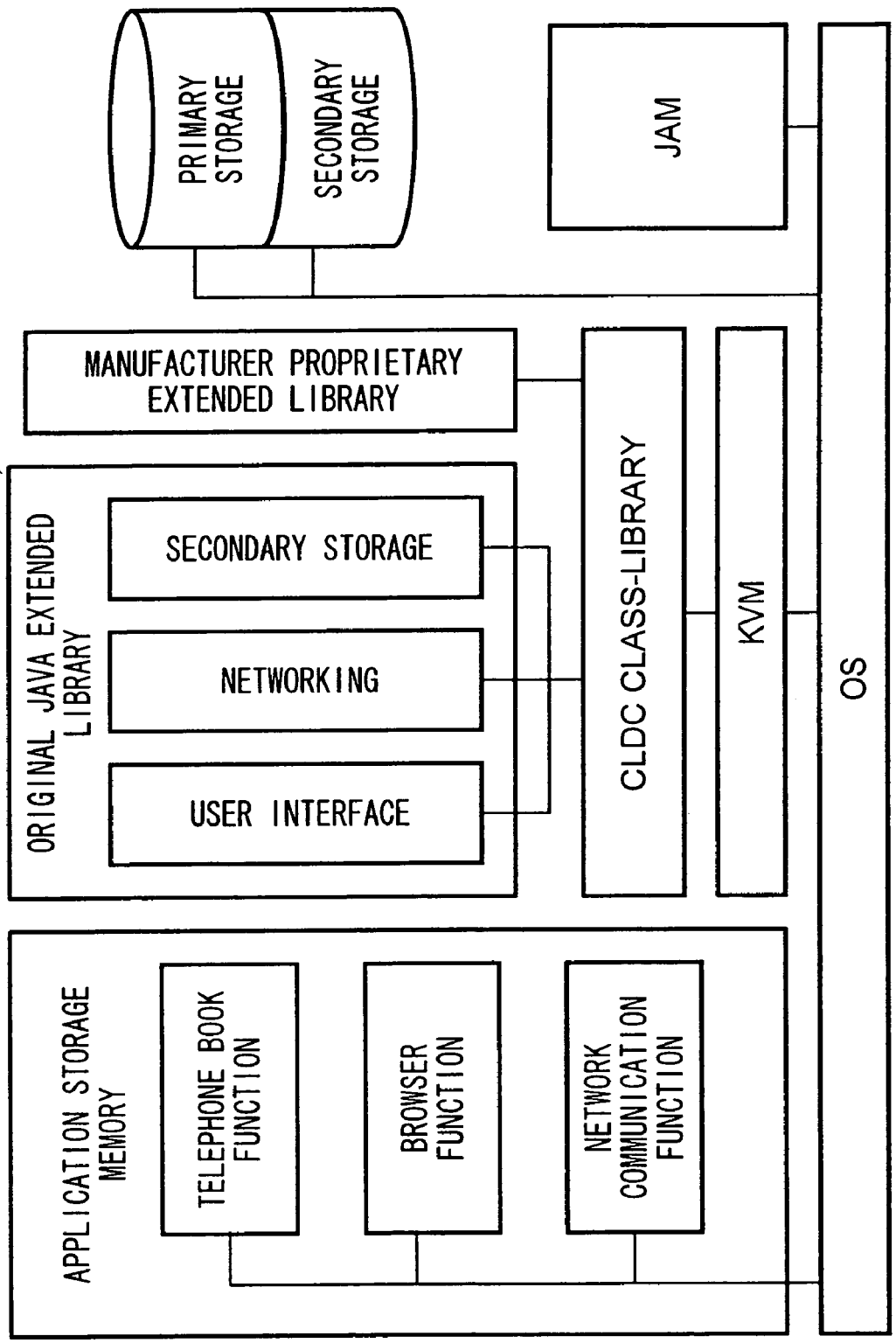
FIG. 7 is a diagram for explaining Java runtime environment according to the present embodiment.

FIG. 7 is a diagram for explaining the configuration of Java runtime environment provided in Java-enabled MS 600. In the following explanation, suppose that Java-enabled MS 600 is provided with a Java runtime environment installed in a device which, compared to a personal computer (hereinafter, referred to as PC) strictly regulates the use of computing resources such as a CPU, a memory, and a hard disk; in the current explanation, the Java runtime environment is J2ME: Java 2 Micro Edition. J2ME introduces two conceptions, namely, Configuration and Profile; in the present embodiment, suppose that CLDC (Connected Limited Device Configuration) applicable to a device having low processing ability is used as Configuration and a profile uniquely developed by providers engaged in delivery management business (hereinafter, referred to as original Java extended profile) is used as Profile.

A native application is an application for providing voice communication function or function for analyzing/running applications written in mobile device-enabled markup language; the application comprising software for providing browser function (a micro-browser), software for providing telephone book function, software for providing network communication function.

KVM (Kilo Virtual Machine) is made by redesigning JVM (Java Virtual Machine) as a small-sized built-in device such as a mobile device, and the KVM is operable by a memory of kilo byte unit (the "K" of KVM is derived from the fact that the machine requires a memory by a kilo byte unit for operation). JVM is software for interpreting/running Java applications.

CLDC class library includes classes which is a subset transferred from J2SE (Java 2 Standard Edition; Java runtime environment supposed to be installed in PC), an upper edition of J2ME, and classes specific to CLDC.

Original Java extended library is a class library for enabling the realization of the function of the above described original Java extended profile; the library enables the realization of the Java extended profile by utilizing various classes provided from each class library or an API (Application Program Interface; a protocol defining the processes in a program at the time of using OS or various libraries).

API typically refers to a protocol used at the time of calling a class in each library; hereinafter, for the sake of explanation, classes provided from each library are referred to as API.

APIs provided from the original Java extended library includes a networking interface API, a user interface API, and a second storage API.

A networking API is an API for supporting the connection with network resources specified by a URL (such as Java-enabled CS 200), and the API supports the network connection using an HTTP (Hyper Text Transfer Protocol) communication and HTTPS (Hypertext Transfer Protocol Security) communication. A user interface API is an API for providing various user interface functions. A second storage API is an API for supporting function of reading/writing data in a second storage.

Java-enabled MS 600 of the present embodiment installs manufacturer proprietary extended library, additionally given by each mobile device manufacturer for providing its unique function, along with the above-explained CLDC class library and original Java extended library.

JAM (Java Application Manager) is software for providing the function of managing a Java application installed in Java-enabled MS 600. More specifically, JAM provides the following functions; a function for determining whether a Java application is available; a function for list displaying Java applications stored in Java-enabled MS 600; a function for activating or performing a shut down on a Java application; a function for installing or updating a Java application; and a function for deleting the existing Java applications stored in Java-enabled MS 600.

A first storage is a storage mechanism for storing Java applications downloaded from Java-enabled CS 200, or information required for preparing the above described request message RQ (refer to FIG. 3).

A second storage is a storage mechanism for storing the above-described permanent data, and is given a different storage area for each Java application installed in Java-enabled MS 600.

Various software forming Java runtime environment are executed by hardware resources such as CPU provided in Java-enabled MS 600.

Next, communication operations of a Java application that communicates with Java-enabled CS 200, the download source, each time the application is activated will be explained. In the following explanation, suppose that a user sets the activation timing of the Java application (a timer activation set by a user), and the Java application communicates with Java-enabled CS 200, the download origin, according to the timing being set.

(2) Operations of Embodiment

A user manipulates the operation keys of Java-enabled MS 600 to select a Java application and sets the activation timing of the Java application (the application may be activated every 30 minutes). Information relating to a Java application selected and activation timing set by a user is stored in non-volatile memory 653 of Java-enabled MS 600. Referring to the information stored in non-volatile memory 653 and a timer (not shown), CPU 610 determines whether it is time to activate the selected Java application.

When determining that it is time to activate the Java application, CPU 610 generates a request message RQ, shown in the above FIG. 3, to start communication between the Java application and Java-enabled CS 200, the download source. To describe it more specifically, CPU 610 reads out from non-volatile memory 653: location information indicating the resource location stored in correspondence with the Java application; method information indicating a method type; content information indicating a content type; mobile device identification information such as a telephone number; and the above described Java application related information, and describes them in request header RH; and in a case of using POST method as a method type, describes in request body RB various information to be transmitted to Java-enabled CS 200 to prepare request message RQ.

When the request message RQ is prepared, CPU 610 sends the communication to Java-enabled CS 200 via communication unit 620 and antenna 621. The request message RQ is received by gateway server 400 that relays sending/receiving of data between Java-enabled MS 600 and Java-enabled CS 200. System control unit 410 of gateway server 400 refers to communications identification information included in the request header RH of the received request message RQ and determines whether the communication request is sent from a Java application or from a micro-browser using HTML base.

Figure 8:
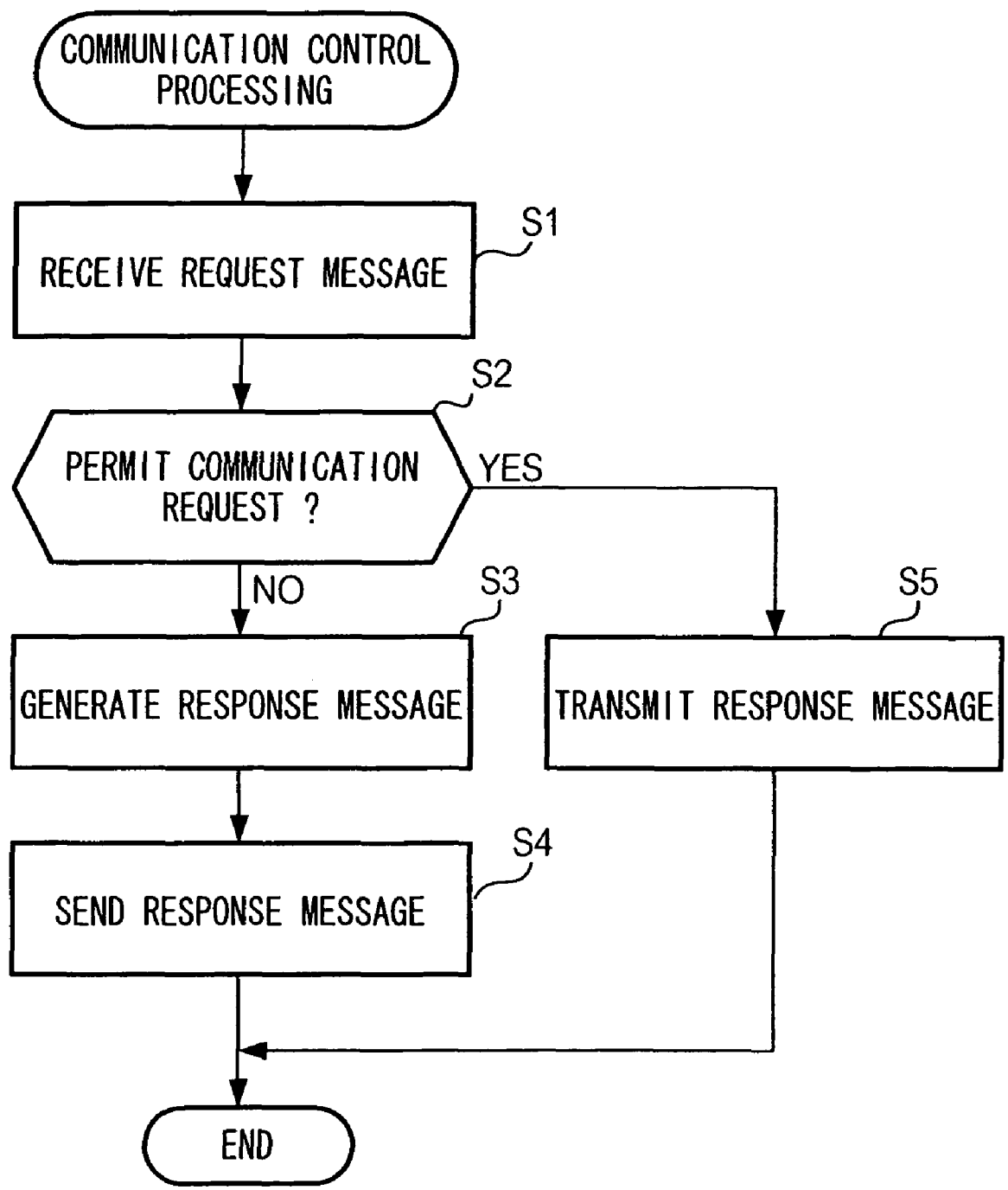
FIG. 8 is a flowchart showing a communication control process according to the present embodiment.

In a case that a communication request is determined to be sent from micro-browser, system control unit 410 performs communication processes such as subjecting the request message received from Java-enabled MS 600 to protocol conversion and transmits the message to a server (not shown) corresponding to a URL. Conversely, in a case that a communication request is determined to be sent from a Java application, system control unit 410 reads out a communication control program stored in ROM to perform the communication control processes shown in FIG. 8.

When receiving a request message RQ from Java-enabled MS 600 (step S1), system control unit 410 determines whether to permit the communication request, by referring to communication management table TA stored in communication information management unit 420. Specifically, system control unit 410 compares current communication information registered with the communication management table TA (the information is, for example, the traffic running through gateway server 400 at that point) with first communication information registered with communication management table TA (information for regulating communication from Java applications in a case that a plurality of Java applications access gateway server simultaneously).

In a case of determining that the traffic indicated by current communication information is heavier than the traffic indicated by first communication information (step S2; NO), system control unit 410 prepares response message RS (refer to FIG. 5) including communication rejection information for rejecting a communication request, or communication regulation information for not allowing communication for (n) seconds after receiving the response message RS (step S3) and sends the message to Java-enabled MS 600 via mobile packet communications network 500 (step S4) to end the processes.

On the other hand, in a case that the traffic indicated by current communication information is lower than the traffic indicated by a first communication information, system control unit 410 compares Java application related information included in the request header RH of the received request message RQ with secondary communication regulating information registered in communication management table TA. As described above, secondary communication regulating information includes information relating to Java applications which may cause communication trouble such as endless continuation of communication due to the presence of a bug.

In a case that a determination is made that a communication request from a Java application is to be rejected (step S2; NO), because Java application identification information included in secondary communication regulating information and Java application identification information included in request message RQ agree with each other, system control unit 410 prepares response message RS (step S3), which is the same process as described above, and sends the message to Java-enabled MS 600 via mobile packet communications network 500 (step S4) to end the processes.

In a case that a determination is made that the traffic indicated in current communication information is lower than the traffic indicated in communication regulation information, and that there is no common information between various information included in Java application related information and various information included in secondary communication regulating information, system control unit 410 determines that a communication request from the Java application is to be permitted (step S2; YES) and proceeds to step S5. In step S5, system control unit 410 subjects the request message received from Java-enabled MS 600 to protocol conversion and transmits the message to Java-enabled CS 200 corresponding to positional information included in request header RH to end the processes.

When receiving the request message RQ from gateway server 400 via Internet 300, Java-enabled CS 200 communicates to Internet 300 text data and image data corresponding to positional information included in the request message RQ. As such, the text data and image data are sent to Java-enabled MS 600 via gateway server 400. When receiving the data, CPU 610 of Java-enabled MS 600 activates a confirmation dialogue (not shown) to notify a user that the data reception completed successfully, displays the dialogue on display unit, and ends communication with Java-enabled CS 200.

As explained, according to the present embodiment, in a case that communication is performed between a Java application installed in Java-enabled MS 600 and Java-enabled CS 200, the download source, gateway server 400 that relays the communication refers to both Java application related information request included in a message RQ sent from Java-enabled MS 600 and communication management table TA stored in communication information management unit 420, thereby determining whether to permit the communication request. In a case that the communication request is permitted, gateway server 400 transmits the request message RQ to Java-enabled CS 200; in the case that the communication request is rejected; the server does not transmit the request message RQ to Java-enabled CS 200, but sends to Java-enabled MS 600 response message RS indicating the rejection of the communication request.

Primary communication regulating information for regulating communication from Java applications in a case that a plurality of Java applications access gateway server simultaneously is included in communication management table TA. Gateway server 400 regulates the communication from a Java application by comparing the first communication information with current communication information; thus, gateway server 400 is capable of reducing the load at peak time even at the time when traffic temporarily passing through gateway server 400 is anticipated to be excessively high, such as the end of a year.

Communication management table TA further includes secondary communication regulating information for identifying Java applications that are likely to cause a traffic malfunction such as communicating endlessly due to the presence of a bug. Gateway server 400 regulates the communication from a Java application by comparing the secondary communication information with current communication information; thus, even in a case that a Java application that is likely to cause the above described traffic malfunction performs a communication request, gateway server 400 is able to reject a communication request from the Java application and to prevent a communication problem occurring because of the Java application.

As explained, by regulating the load at peak time and preventing the above described communication malfunction, the problem including a breakdown at gateway server 400 (namely, the communication relaying function of gateway server 400 breakdowns) caused by the communication malfunction is pre-empted.

Even in a case that Java-enabled MS 600 is installed with a Java application that is likely to cause a traffic malfunction, gateway server 400 regulates communication from the Java application. Therefore, a problem such as communication being performed between the Java application and Java-enabled CS 200, the download source of the Java application, without a request from a user of Java-enabled MS 600 and the resulting communication fees unexpected by the user will be pre-empted.

B. Modifications

One embodiment of the present invention has been explained; however, the above embodiment is simply an example and various modifications are applicable to the embodiment described above within the scope of the object of the present invention.

Modification Example 1

In the above described embodiment, an activation mode of a Java application installed in Java-enabled MS 600 is illustrated, wherein; a Java application is activated by following the activation timing set by a user. However, in another embodiment, in a case that a Java application installed in Java-enabled MS 600 is an application downloaded from Java-enabled CS 200, the present invention is also applied to an embodiment in which a Java application is activated following the timing information described in ADF shown below.

A Java application being downloaded from Java-enabled CS 200 comprises a JAR file of several tens of kilobytes containing program files of a Java application body and resources such as image or voice files, and a text file of several tens of kilobytes called ADF (Application Descriptor File) describing various types of information relating to the JAR file.

FIG. 9 is a diagram illustrating a descriptive entry of ADF.

ADF contains file size information indicating the size of JAR file (such as 10 kilobytes), URL information indicating the storage location of the JAR file (such as http://www . . . ), and model information indicating the model of mobile device that is able to use the JAR file (such as DCMH 505).

At the time of downloading a desired Java application from Java-enabled CS 200, a user having Java-enabled MS 600 accesses Java-enabled CS using a micro-browser of 200 to download an ADF. When an ADF is downloaded, Java-enabled MS 600 refers to the contents described in the ADF and judges whether the Java application is available. Only in a case that the Java application is judged to be available, Java-enabled MS 600 downloads a JAR file using URL information described in the ADF.

Thus, a JAR file is not directly downloaded; instead, the reduction in communication fees is achieved by using a model wherein, an ADF, the size of which is smaller than a JAR file, is downloaded to check only the basic items.

An ADF contains essential items: such as file size information indicating the size of JAR file (such as 10 kilobytes); URL information indicating the storage location of the JAR file (such as http://www . . . ); and model information indicating the model of a mobile device that is able to use the JAR file (such as DCMH 505), and option item such as timing information indicating the auto-activation timing (such as every 45 minutes) (refer to FIG. 9).

In Java-enabled MS 600 installed with the Java application, the Java application is activated in accordance with timing information described in an ADF. In a case that the Java application is an application that communicates with Java-enabled CS 200 (the download source) each time the application is activated (the Java application being activated on the basis of the timing information) to communicate with Java-enabled CS 200 (the download source). When the Java application communicates with Java-enabled CS 200 (the download source), request message RQ including activation type information that indicates that the activation is caused by an ADF is sent from Java-enabled MS 600 to gateway server 400.

Even in the case of activating the type of Java application that communicates with Java-enabled CS 200 (the download source) in accordance with timing information described in an ADF, gateway server 400 that relays the communication refers to Java application related information, included in a request message RQ sent from Java-enabled MS 600, and to communication management table TA stored in communication information management unit 420, thereby determining whether to permit the communication request. In the case of rejecting the communication request, the gateway server cancels the transmission of request message RQ to Java-enabled CS 200 and sends a response message RS indicating the rejection of the communication request to Java-enabled MS 600. Consequently, the same effects as those of the above-described embodiment are achieved.

Explanations have been illustrated including the following modes: activating a Java application by following the activation timing set by a user: activating a Java application by following the timing information described in an ADF. In a preferred embodiment, the activating mode described below is also used.

a) A mode in which a Java application is activated immediately after being downloaded b) A mode in which the activation of a Java application is triggered by an e-mail distributed to Java-enabled MS 600 c) A mode in which the activation of a Java application is triggered by commands received by an external equipment interface provided in Java-enabled MS 600 (IrDA, Bluetooth)

d) A mode in which a Java application is activated on the basis of intervals instructed by Java-enabled CS 200

Along with activating modes as illustrated in the above a) through d), another mode exists; wherein, a Java application set for standby display is activated for a predetermined time period (the application may be activated for 50 seconds starting at 2 A.M., for example). In a case that the Java application installed in Java-enabled MS 600 communicates with Java-enabled CS 200, the download source, a request message RQ including activation type information that indicates the activating mode being used is sent to Java-enabled CS 200. As illustrated, various activating modes are used; the type of activating mode to be used is changeable depending on the design of Java-enabled MS 600.

Modification Example 2

In the present embodiment stated above, an explanation is given in which all of the information: communication identification information; Java application identification information; activation type information; and download source identification information are included in Java application related information. In a preferred embodiment, communication identification information, for example, may only be included in Java application related information. That is, only primary communication regulating information is registered with communication management table TA, and a determination as to whether to permit communication by a Java application is made with reference to the primary communication regulating information and current communication information. Similarly, only activation type information may be included in Java application related information; in this embodiment, only activation type information which may be a secondary communication regulating information is registered with communication management table TA, and referring to the activation type information registered as the secondary communication regulating information and activation type information included in request message RQ, a determination is made as to whether to permit communication by a Java application.

Similarly, only download source identification information may be included in Java application related information; in this embodiment, only download source identification information which may be a secondary communication regulating information is registered with communication management table TA, and referring to the download source identification information registered as the secondary communication regulating information and download source identification information included in request message RQ, a determination is made as to whether to permit communication by a Java application.

Furthermore, Java application identification information may be included in Java application related information; in this embodiment, only Java application identification information which may be secondary communication regulating information is registered with communication management table TA, and referring to the Java application identification information registered as secondary communication regulating information and Java application identification information included in request message RQ, a determination is made as to whether to permit communication by a Java application.

As illustrated, whether to permit communication by a Java application may be determined using either one type of information included in a Java application related information or a plurality of types of information.

In the case of using an activation type information to determine whether to permit communication, rejection of the communication by the Java application described in Java language along with applications written in other programming languages is also achievable as long as the application is activated by the same activating mode as an activating mode identified by the activation type information.

Modification Example 3

In the present embodiment stated above, an embodiment in which communication by a Java application is rejected is illustrated as one embodiment for regulating communication by a Java application; in another embodiment, however, amount of traffic, duration of communication, and the time of communication may also be regulated by comparing Java application related information included in request message RQ with communication management table TA. Namely, communication regulation on the above-described Java application according to the present modification can be arbitrarily changed depending on the design of gateway server 400.

Modification Example 4

In the embodiments described above, communication identification information indicating that a communication request is sent from a Java application, Java application identification information for identifying the Java application, activation type information indicating the activation mode of the Java application, download source identification information for identifying Java-enabled CS 200, the download source of the Java application, are illustrated as Java application related information included in a request message RQ. Conversely, Java application related information may also be version information of a Java application. Consequently, any information relating to the Java application is used as Java application related information.

In the present embodiment described above, Java application identification information, activation type information, download source identification information are illustrated as secondary communication information registered with a communication management table TA; as in the case of the above-described Java application related information, any information for identifying a Java application that may cause communication problem is used as secondary communication regulating information.

Specifically, any information is used as Java application related information and secondary communication regulating information as long as gateway server 400 is able to determine whether to permit a communication request in a case that gateway server 400 receives a request message RQ.

Modification Example 5

In the present embodiment described above, an explanation is given with respect to an example in which communication rejection information for rejecting a communication request and communication regulation information for regulating communication for n seconds, when receiving the message, are included in a response message RS; however, a response message including only communication rejection information, or a response message including a communication frequency (communication frequency in one day), amount of traffic (amount of traffic in one day), and duration of communication (duration of communication in one day), as the communication regulation information may also be used.

Modification Example 6

In the present embodiment described above, to prevent in advance a problem occurring such as information flowing to other servers, the communication party of a Java application is limited to Java-enabled CS 200, the download origin; servers other than Java-enabled CS 200, the download origin, may also be set as the communication party of a Java application. In the present embodiment and the modifications described above, an explanation is given with respect to an example in which communication is performed using HTTP and HTTPS; the communication protocol used in communication may be arbitrarily changed depending on the design of Java-enabled MS 600.

Modification Example 7

In the present embodiment described above, a Java application downloaded from Java-enabled CS 200 is illustrated as an example; the present invention is also applicable to the Java application preinstalled in a Java-enabled MS 600 (an original Java application prepared by a carrier providing Java-enabled MS 600).

Modification Example 8

Furthermore, the functions of the Java-enabled MS 600 or gateway server 400 explained in the embodiments described above are also achieved by using software. Specifically, a server including either the software or a storage medium (a memory card) storing the software installs in either a storage unit of Java-enabled MS 600 or a memory (not shown) of gateway server 400 via a transmission media (mobile packet communications network). As described above, the stated functions are also realized by using software.

Modification Example 9

FIG. 10 is a diagram illustrating various locations of the profiles in Java runtime environment provided in Java-enabled MS 600.

In the present embodiment described above, an explanation is given with respect to a mobile device installed with CLDC as a configuration and original Java extended profile as a profile (refer to A shown in FIG. 10); in the place of original Java extended profile, the present invention is also applicable to a mobile device provided with a profile defined, by undergoing a standardization process of Java (Java Community Process; JCP), for a mobile terminal (MIDP; Mobile Information Device Profile) such as mobile device (refer to B shown in FIG. 10), or to a mobile device provided with original Java extended profile and MIDP (refer to C shown in FIG. 10).

In the present embodiment described above, a mobile device such as a mobile phone is illustrated as one example of a small terminal; the present invention is also applicable to any small terminal provided with CLDC such as PDS or PHS (Personal Handyphone System). Furthermore, the present invention is not limited to a small-size terminal provided with CLDC, and is also applicable to a medium-size terminal or a large-size terminal including a car navigation system or a set-top box provided with CDC (Connected Device Configuration). In a medium-size terminal or a large-size terminal provided with CDC, a profile such as "J2ME Foundation Profile" is provided and JVM is equipped instead of VIM.

Modification Example 10

In the present embodiment described above, an explanation is given with respect to a case where gateway server 400 regulates communication by a Java application installed in Java-enabled MS 600; the communication management table TA may also be stored in base stations accommodated in for example, mobile packet communications network 500, thereby allowing the base stations to regulate communication from a Java application. Therefore, the present invention is applicable to any device, as long as the device is accommodated in mobile packet communications network 500 and relays the communication between Java-enabled MS 600 and Java-enabled CS 200 (equivalent to "relay device" described in Claims).

Modification Example 11

In the present embodiment described above, an explanation is given with respect to the case where a Java application is stored in application storage memory 653a of Java-enabled MS 600; a Java application may also be stored in a UIM (User Identity Module) used for third generation mobile phone.

Figure 11:
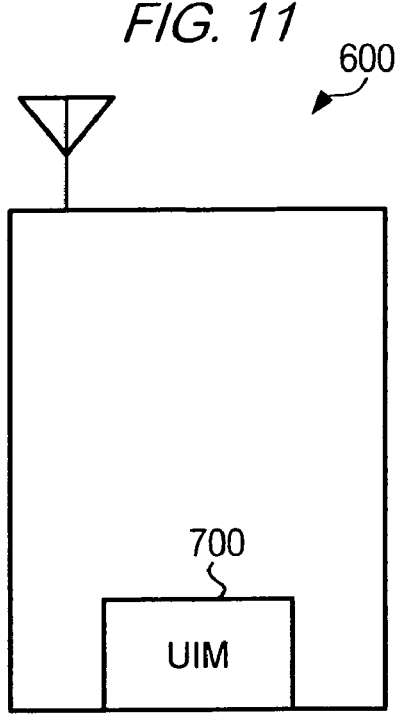
FIG. 11 is a diagram for explaining a UIM according to the modification example 11.
Figure 12:
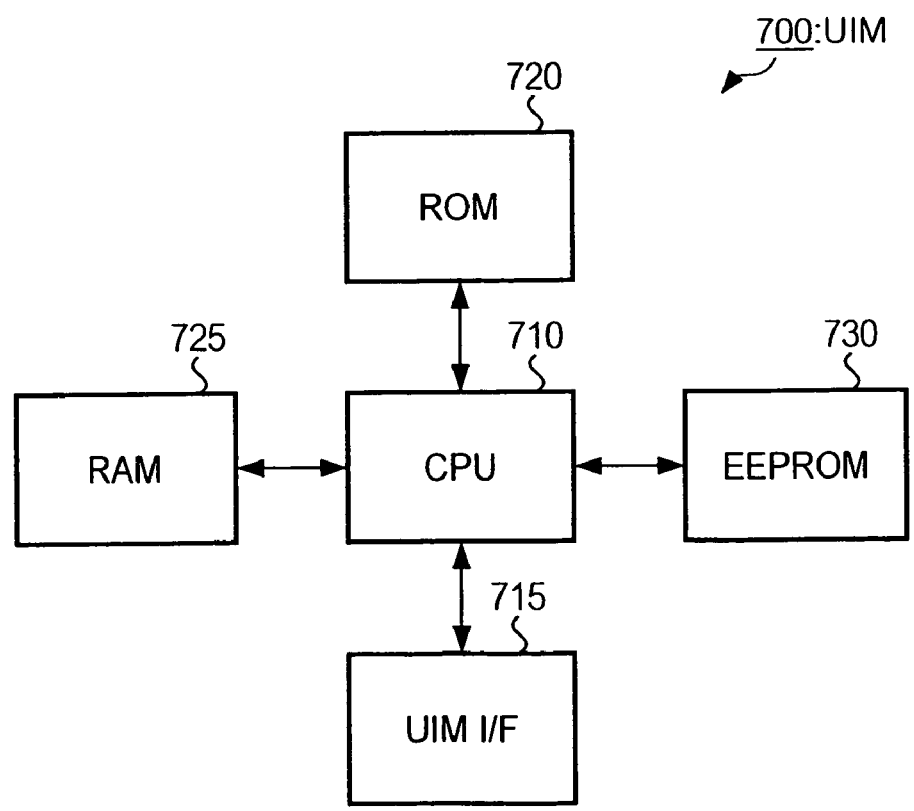
FIG. 12 is a diagram for explaining a UIM according to the modification example 11.

FIG. 11 and FIG. 12 are diagrams for explaining a UIM 700.

Figure 13:
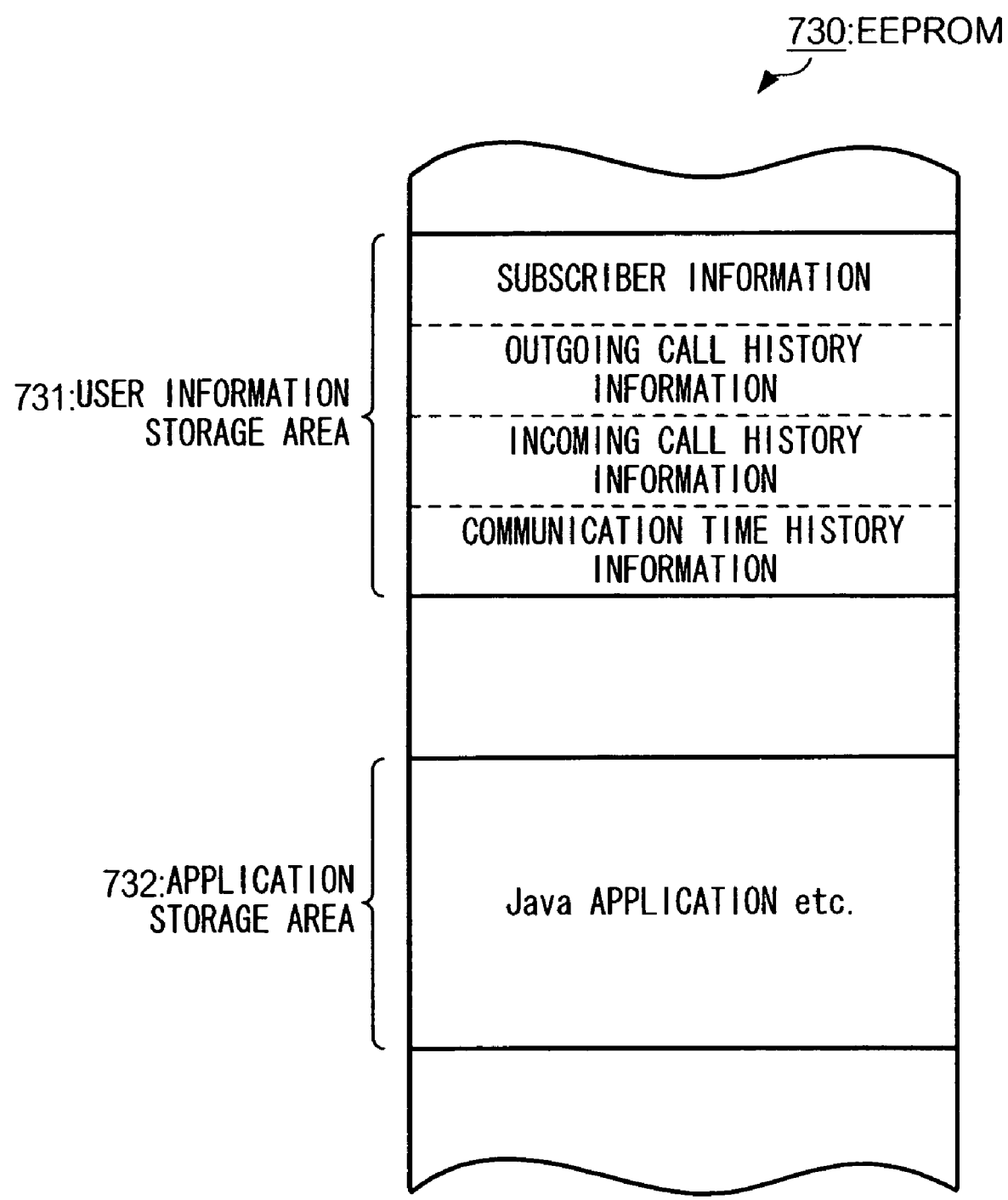
FIG. 13 is a diagram for explaining a storage area of EEPROM according to the modification example 11.

UIM 700 is an IC card which is removable from Java-enabled MS 600; the UIM comprises a CPU 710 for controlling each part of UIM 700 on the basis of the control program stored in ROM 720, a UIM interface 715 for connecting the UIM to Java-enabled MS 600, a RAM 725 for temporarily storing data provided from Java-enabled MS 600, and an EEPROM 730 in which a Java application is stored. FIG. 13 is a diagram for explaining a storage area of EEPROM 730.

EEPROM 730 has a user information storage area 731, or an application storage area 732.

User information storage area 731 stores information specific to a user carrying UIM 700; the information includes subscriber number, outgoing history information, incoming history information, communication time information.

Application storage area 732 stores various types of information stored in the above-described application storage memory 653a; namely, the information includes a Java application downloaded from Java-enabled CS 200 or a permanent file, or information required to prepare a request message to be sent to Java-enabled CS 200, the download origin. The Java application stored in application storage area 732 may be an application downloaded from Java-enabled CS 200 to UIM 700 via Java-enabled MS, or an application pre-stored in UIM 700.

Now, in a state that information specific to a user and a Java application are stored in UIM 700, when an instruction to start communication is given by the Java application, CPU 710 of UIM 700 (or CPU 610 of Java-enabled MS 600) generates a request message RQ and sends the message to Java-enabled CS 200 via Java-enabled MS 600. Since the communication regulation operation performed at gateway server 400 is the same as the present embodiment described above, an explanation will be omitted.

As explained above, by having gateway server 400 performing communication regulation on a Java application stored in UIM 700, a communication regulation is not achievable for each mobile device, but for each user. As a result, the occurrence of a problem in communication is prevented for example, by rejecting at gateway server 400 a communication request from an illegal user. In the present modification, UIM 700 is illustrated as a communication terminal that stores a Java application; however, the present invention is not limited thereto, and is applicable to any communication terminal having communication function for communicating between external equipments and Java runtime environment such as J2ME (Java 2 Micro Edition), J2SE (Java 2 standard edition), and J2EE (Java 2 Enterprise Edition). In the present embodiment described above, a Java application written by Java is illustrated as an example; however, the present invention is also applicable to applications written by any programming language, as long as the application communicates via gateway server 400.

The invention claimed is:

1. A communication system comprising:
a communication terminal; and
a relay device that relays data communication between the communication terminal and a server;
the communication terminal comprising:
    a communication unit;
    a first storage unit configured to store an application program executable to communicate with the server via a network and the communication unit; and
    a first processing unit configured to execute the application program to communicate with the server in accordance with the application program, to generate a communication request including application related information related to the application program, and to send the communication request to the server, the application related information including an application identifier indicative of the application program and a first identifier indicative of a download source from which the application program was received by the communication terminal;
the relay device comprising:
    a second storage unit configured to store regulation information to regulate the data communication requested by the communication request, the regulation information including the application identifier indicative of the application program stored in association with a second identifier indicative of an original source of the application program, the regulation information also including a traffic threshold; and
    a second processing unit configured to receive the communication request from the communication terminal, wherein the second processing unit is further configured to relay the data communication in accordance with the regulation information stored in the second storage unit, and
    the second processing unit is further configured to decrease an amount of data in the relayed data communication in response to the communication request satisfying a first condition and a second condition, the first condition being that traffic in the network is heavier than the traffic threshold included in the regulation information stored in the second storage unit, and the second condition comprising the download source, indicated in the first identifier received in the communication request, being identical to the original source indicated in the second identifier included in the regulation information.

2. The communication system of claim 1, wherein the application related information includes communication identification information, the communication identification information indicating, in a case that the application program executed by the first processing unit is a specific type application program, that the data communication is performed by the specific type application program, and the second condition further comprising that the application related information included in the communication request includes the communication identification information indicating that the data communication is performed by the specific type application program.

3. The communication system of claim 1, wherein the second storage unit is further configured to store first activation type information indicating a first activation mode of the application program, the application related information includes second activation type information indicating a second activation mode of the application program, and the second condition further comprising that the second activation mode indicated by the second activation type information included in the application related information is equivalent to the first activation type information stored in the second storage unit.

4. The communication system of claim 1, wherein the regulation information further includes at least one of: a condition to regulate a duration of the data communication; a condition to regulate an amount of the data communication, a condition to regulate an amount of traffic, and a condition to regulate a communication frequency of the data communication, or a combination thereof.

5. A relay device for relaying data communication between a communication terminal and a server; the relay device comprising:

a first storage unit configured to store regulation information to regulate the data communication in response to a communication request received from a communication terminal, the communication request including an application identifier indicative of an application program and a first identifier indicative of a download source from which the application program was downloaded to the communication terminal;

the stored regulation information including a traffic threshold and the application identifier indicative of the application program stored in association with a second identifier indicative of a predetermined original provider of the application program; and a processing unit configured to receive the communication request from the communication terminal and confirm a first condition and a second condition are satisfied, the first condition being that a level of traffic through the relay device exceeds the traffic threshold, and the second condition comprising the download source indicated with the first identifier received in the communication request being identical to the predetermined original provider indicated with the second identifier included in the stored regulation information; and the processing unit further configured, in response to the communication request satisfying the first condition and the second condition, to invoke a guideline for the data communication between the communication terminal and the server and relay the data communication in accordance with the regulation information stored in the first storage unit.

6. The relay device of claim 5, wherein the communication request comprises communication identification information, the communication identification information indicating a specific type of the application program being executed by the communication terminal to generate the communication request, and wherein, the second condition further comprises that the communication request includes the communication identification information indicating the specific type of the application program.

7. The relay device of claim 5, wherein the first storage unit is further configured to store first activation type information indicating a first activation mode of the application program resident on the communication terminal, wherein the communication request includes second activation type information indicating a second activation mode of the application program, and the second condition further comprising that the second activation mode indicated by the second activation type information is equivalent to the first activation type information stored in the first storage unit.

8. The relay device of claim 5, wherein the regulation information includes at least one of: a condition to regulate a duration of the data communication; a condition to regulate an amount of the data communication, condition to regulate an amount of traffic, and a condition to regulate a communication frequency of the data communication, or a combination thereof.

9. A method in a communication system that includes a communication terminal and a relay device that relays data communication between the communication terminal and a server, the communication terminal including a communication unit and a first storage unit configured to store an application program executable to communicate with the server via a network and the communication unit, the relay device including a second storage unit configured to store regulation information for regulating the data communication in response to a communication request, the method comprising:

generating, with the communication terminal, the communication request to include application related information related to the application program, the application related information including an application identifier indicative of the application program and a first identifier indicative of a download source from which the application program was received by the communication terminal;

sending, with the communication terminal, the communication request to the server;

receiving, with the relay device, the communication request from the communication terminal;

comparing the communication request to the stored regulation information with the relay server, the stored regulation information including a traffic threshold and the application identifier indicative of the application program stored in association with a second identifier indicative of an original provider of the application program;

confirming with the relay device that a first condition and a second condition are satisfied, the first condition being that traffic in the network is heavier than the traffic threshold included in the stored regulation information, and the second condition comprising the download source indicated with the first identifier received in the communication request being identical to the original provider indicated with the second identifier included in the stored regulation information; and invoking a constraint of the data communication between the communication terminal and the server with the relay device, if the communication request satisfies the first condition and the second condition, the constraint of the data communication invoked by the relay device in accordance with the regulation information stored in the second storage unit.

10. The method of claim 9, wherein the application related information includes communication identification information, the communication identification information indicating, in a case that the application program executed by the communication terminal is a specific type of application program, that the data communication is performed by the specific type of application program, and confirming the second condition is satisfied further comprises confirming that the application related information includes the communication identification information indicating that the data communication is performed by the specific type of application program.

11. The method of claim 9, further comprising storing first activation type information indicating a first activation mode in the second storage unit included in the relay device, wherein the application related information includes a second activation type information indicating a second activation mode of the application program, and confirming the second condition is satisfied further comprises confirming that the second activation mode indicated by the second activation type information included in the application related information is equivalent to the first activation type information stored in the second storage unit.

12. The method of claim 9, wherein the regulation information further includes at least one of: a condition to regulate a duration of the data communication; a condition to regulate an amount of the data communication, a condition to regulate an amount of traffic, and a condition to regulate a communication frequency of the data communication, or a combination thereof.

13. The communication system of claim 1, wherein the second processing unit is further configured to transmit a response message to the communication terminal in response to the communication request satisfying the first and second conditions, the response message comprising an instruction to the communication terminal to regulate the data communication between the communication terminal and the server in accordance with the regulation information.

14. The relay device of claim 5, wherein the processing unit is further configured to transmit a response message to the communication terminal in response to the communication request, the response message comprising the guideline for the data communication between the communication terminal and the server.

15. The method of claim 9, wherein invoking a constraint of data communication between the communication terminal and the server comprises the relaying device transmitting a response message to the communication terminal in response to the communication request, the response message comprising communication regulation information to constrain the communication terminal with regard to data communication with the server.

16. The communication system of claim 1, wherein the first identifier indicative of the download source identifies a first server, and the second identifier indicative of the original source of the application program also identifies the first server.

17. The communication system of claim 1, wherein the second condition further comprises that the application identifier is identical in the application related information and the regulation information.

18. The communication system of claim 1, wherein the second processing unit is further configured to relay the data communication without regard to the first condition or the second condition in response to the communication request failing to satisfy an initial predetermined condition of the application program being a specific type of application program.

19. The relay device of claim 5, wherein the first identifier indicative of the download source identifies a first server, and the second identifier indicative of the predetermined original provider of the application program also identifies the first server.

20. The method of claim 9, wherein comparing the communication request to the stored regulation information comprises the step of confirming that a first server identified by the first identifier is also identified by the second identifier.

* * * * *